United States Patent
Ogasawara

(10) Patent No.: US 9,185,305 B2
(45) Date of Patent: Nov. 10, 2015

(54) PHOTOGRAPHY SYSTEM, CAMERA, AND PHOTOGRAPHY ILLUMINATION DEVICE

(75) Inventor: Akira Ogasawara, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 86 days.

(21) Appl. No.: 13/510,084

(22) PCT Filed: Nov. 19, 2010

(86) PCT No.: PCT/JP2010/070711
§ 371 (c)(1),
(2), (4) Date: May 16, 2012

(87) PCT Pub. No.: WO2011/062262
PCT Pub. Date: May 26, 2011

(65) Prior Publication Data
US 2012/0230663 A1    Sep. 13, 2012

(30) Foreign Application Priority Data
Nov. 19, 2009    (JP) .................................. 2009-263627

(51) Int. Cl.
*G03B 17/00*    (2006.01)
*H04N 5/235*    (2006.01)
(Continued)

(52) U.S. Cl.
CPC ............. *H04N 5/2354* (2013.01); *G03B 7/16* (2013.01); *G03B 15/03* (2013.01); *H04N 5/2256* (2013.01); *H04N 5/23203* (2013.01); *G03B 2215/0557* (2013.01)

(58) Field of Classification Search
USPC ................ 396/56–59, 429; 348/14.02, 14.04, 348/14.05, 211.2, 211.99, 725, 734
See application file for complete search history.

(56) References Cited

U.S. PATENT DOCUMENTS 6,088,542 A * 7/2000 Yanai et al. ................... 396/155
6,571,062 B2 * 5/2003 Ogasawara ................... 396/159
(Continued)

FOREIGN PATENT DOCUMENTS

JP    A-2002-196404    7/2002
JP    A-2008-32909    2/2008
(Continued)

OTHER PUBLICATIONS

International Search Report issued in International Application No. PCT/JP2010/070711 dated Dec. 21, 2010.
(Continued)

*Primary Examiner* — Clayton E LaBalle
*Assistant Examiner* — Warren K Fenwick
(74) *Attorney, Agent, or Firm* — Oliff PLC

(57) ABSTRACT

A photography system includes: a camera containing a first communication unit; and a photography illumination device containing a second communication unit, wherein: the camera wirelessly transmits from the first communication unit to the second communication unit a first signal that commands, from the camera side to the photography illumination device side, a preparatory flash emission that precedes a main flash emission during photography; the photography illumination device wirelessly transmits from the second communication unit to the first communication unit a second signal that includes flash emission timing information of the preparatory flash emission, and that carries information, from the photography illumination device side to the camera side, as to the effect that the first signal has been received; and the camera starts photometric processing during the preparatory flash emission based upon the flash emission timing information.

14 Claims, 6 Drawing Sheets

(51) Int. Cl.
*G03B 7/16* (2014.01)
*G03B 15/03* (2006.01)
*H04N 5/225* (2006.01)
*H04N 5/232* (2006.01)

(56) References Cited

U.S. PATENT DOCUMENTS

| | | | |
|---|---|---|---|
| 6,600,876 B2* | 7/2003 | Sato | 396/55 |
| 8,121,468 B2* | 2/2012 | Clark | 396/56 |
| 8,351,774 B2* | 1/2013 | Clark | 396/56 |
| 8,472,040 B2* | 6/2013 | Kim et al. | 358/1.14 |
| 2007/0209056 A1* | 9/2007 | Mayuzumi | 725/105 |
| 2008/0298793 A1 | 12/2008 | Clark | |
| 2009/0097835 A1* | 4/2009 | Kunishige et al. | 396/56 |
| 2009/0185797 A1 | 7/2009 | Ogasawara | |
| 2010/0202767 A1 | 8/2010 | Shirakawa | |
| 2011/0167008 A1* | 7/2011 | King | 705/304 |
| 2012/0213502 A1* | 8/2012 | Shirakawa | 396/56 |
| 2013/0195271 A1* | 8/2013 | Miyabayashi et al. | 380/255 |

FOREIGN PATENT DOCUMENTS

| | | |
|---|---|---|
| JP | A-2008-102337 | 5/2008 |
| JP | A-2009-33668 | 2/2009 |
| JP | A-2010-185958 | 8/2010 |
| WO | WO 2008/047916 A1 | 4/2008 |
| WO | WO 2008/150902 A1 | 12/2008 |

OTHER PUBLICATIONS

Japanese Office Action dated Nov. 19, 2013 from Japanese Patent Application No. 2009-263627 (with English-language translation).

* cited by examiner

PHOTOGRAPHY SYSTEM, CAMERA, AND PHOTOGRAPHY ILLUMINATION DEVICE

TECHNICAL FIELD

The present invention relates to a photography system, to a camera, and to a photography illumination device.

BACKGROUND ART

A technique is known for synchronizing, between a camera and an electronic flash device that are connected together via wireless communication, the timing of monitor flash emission by the electronic flash device and the timing of photometry by the camera (refer to Patent Document #1). According to Patent Document #1, a master electronic flash device transmits a packet including a command for performance of monitor flash emission to a remote electronic flash device, and, upon reception of this packet, the remote electronic flash device performs monitor flash emission on the basis of a timing specified by the packet.

PRIOR ART DOCUMENTS

Patent Literature

Patent Document #1: Japanese Laid-Open Patent Publication 2008-32909.

DISCLOSURE OF THE INVENTION

Technical Problem

With this prior art technique there is the problem that, if the transmission from the camera side to the electronic flash device side of the packet containing the command for monitor flash emission to be performed has failed (i.e. if it has not been possible for this packet to be received by the electronic flash device side), then the camera side performs photometric operation even though the electronic flash device does not perform monitor flash emission, and this is undesirable.

Means for Solution

According to the 1st aspect of the present invention, a photography system, comprises: a camera comprising a first communication unit; and a photography illumination device comprising a second communication unit, wherein: the camera wirelessly transmits from the first communication unit to the second communication unit a first signal that commands, from the camera side to the photography illumination device side, a preparatory flash emission that precedes a main flash emission during photography; the photography illumination device wirelessly transmits from the second communication unit to the first communication unit a second signal that includes flash emission timing information of the preparatory flash emission, and that carries information, from the photography illumination device side to the camera side, as to the effect that the first signal has been received; and the camera starts photometric processing during the preparatory flash emission based upon the flash emission timing information.

According to the 2nd aspect of the present invention, in the photography system according to the 1st aspect, it is preferred that the flash emission timing information includes information about a time difference from a reference signal in the second signal until the preparatory flash emission is started.

According to the 3rd aspect of the present invention, in the photography system according to the 1st aspect, it is preferred that the flash emission timing information includes information about a time difference from a reference signal in the second signal until the preparatory flash emission is started, and information about a light emission interval of the preparatory flash emission.

According to the 4th aspect of the present invention, in the photography system according to any one of the 1st through 3rd aspects, it is preferred that if the second signal has not been received by the first communication unit even after having waited a predetermined time period after wirelessly transmitting the first signal, then the camera wirelessly re-transmits the first signal.

According to the 5th aspect of the present invention, in the photography system according to the 4th aspect, it is preferred that a wireless re-transmission of the first signal is limited to a predetermined number of times.

According to the 6th aspect of the present invention, in the photography system according to the 5th aspect, it is preferred that when the camera wirelessly transmits from the first communication unit to the second communication unit a third signal that commands, from the camera side to the photography illumination device side, main flash emission during photography, the camera stops wireless transmission of the third signal if the second signal is not received by the first communication unit in spite of the wireless re-transmission of the first signal.

According to the 7th aspect of the present invention, in the photography system according to the 6th aspect, it is preferred that the camera informs of at least one of the fact that no second signal has been received by the first communication unit, and the fact that the main flash emission is not performed.

According to the 8th aspect of the present invention, in the photography system according to any one of the 1st through 7th aspects, it is preferred that: a plurality of photography illumination devices are included; the camera wirelessly transmits the first signal from the first communication unit to the second communication unit of each of the plurality of photography illumination devices; and if there is some photography illumination device from which no second signal has been received after wireless transmission of the first signal, then the camera performs photography using auxiliary photographic light from photography illumination devices other than the some photography illumination device, or performs photography without using auxiliary photographic light from any of the plurality of photography illumination devices.

According to the 9th aspect of the present invention, a camera is a camera constituting a photography system according to any one of the 1st through 8th aspects.

According to the 10th aspect of the present invention, a photography illumination device is a photography illumination device constituting a photography system according to any one of the 1st through 8th aspects.

According to the 11th aspect of the present invention, a camera comprises: a first communication unit that communicates with a photography illumination device having a second communication unit; and a first control unit, wherein: the first control unit wirelessly transmits from the first communication unit to the second communication unit a first signal that commands a preparatory flash emission that precedes a main flash emission during photography; and when a second signal from the second communication unit is received by the first communication unit that includes flash emission timing information of the preparatory flash emission, and that carries information as to the effect that the first signal has been received, then the first control unit starts photometric processing during the preparatory flash emission based upon the flash emission timing information According to the 12th aspect of the present invention, a photography illumination device comprises: a second communication unit that communicates with a camera having a first communication unit; and a second control unit, wherein: when a first signal is received from the first communication unit by the second control unit that commands a preparatory flash emission that precedes a main flash emission during photography, then the second control unit wirelessly transmits from the second communication unit to the first communication unit a second signal that includes flash emission timing information of the preparatory flash emission, and that carries information as to the effect that the first signal has been received.

Advantageous Effect of the Invention

According to the present invention, it is possible to provide a photography system, a camera, and a photography illumination device that perform emission of monitor light and photometry in an appropriate manner.

DESCRIPTION OF THE EMBODIMENTS

Figure 1:
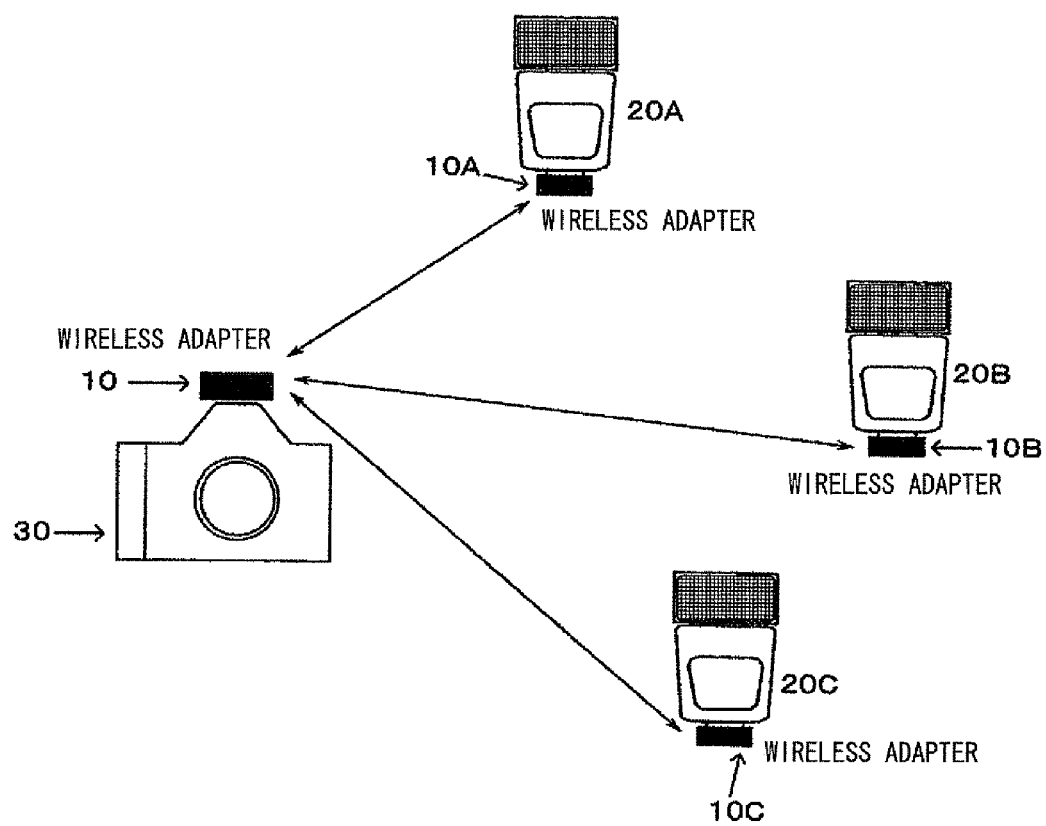
FIG. 1 is a figure showing the structure of a photography system according to an embodiment of the present invention.

In the following, embodiments for implementation of the present invention will be explained with reference to the drawings. FIG. 1 is a figure showing the structure of a photography system according to an embodiment of the present invention. This photography system includes a camera 30 to which a master wireless adapter 10 is installed, and an electronic flash device 20A to which a remote wireless adapter 10A is installed. The master wireless adapter 10 and the remote wireless adapter 10A perform mutual wireless communication according to a standard such as wireless LAN, Bluetooth (registered trademark), ZigBee (registered trademark), or the like.

Furthermore, separately from the electronic flash device 20A, there are also provided an electronic flash device 20B to which a remote wireless adapter 10B is installed and an electronic flash device 20C to which a remote wireless adapter 10C is installed. Each of the master wireless adapter 10 and the remote wireless adapter 10B, and the master wireless adapter 10 and the remote wireless adapter 10C, perform mutual wireless communication according to the standard mentioned above.

The remote wireless adapter 10A, the remote wireless adapter 10B, and the remote wireless adapter 10C have similar structures, and the electronic flash device 10A, the electronic flash device 10B, and the electronic flash device 10C have similar structures.

The master wireless adapter 10 has a camera mounting foot that is mounted on an accessory shoe of the camera 30, and is installed to the camera 30 by this camera mounting foot. And the remote wireless adapter 10A has an accessory shoe that engages with a camera mounting foot of the electronic flash device 20A, and is installed to the electronic flash device 20A by this accessory shoe.

The fact that the electronic flash device 20A has the camera mounting foot is in order to make it also possible for the electronic flash device 20A to be used by being directly installed to the accessory shoe of the camera 30. When the electronic flash device 20A is directly installed to the camera 30, then wireless communication is not performed, since wired communication is performed between the electronic flash device 20A and the camera 30 via terminals not shown in the figures provided to this accessory shoe.

Since this embodiment has the characteristic feature of a usage mode in which wireless communication is performed between the electronic flash device 20A and the camera 30, accordingly the following explanation will concentrate upon the case in which the remote wireless adapter 10A is installed to the electronic flash device 20A and the master wireless adapter 10 is installed to the camera 30.

It should be understood that, while the system shown by way of example in FIG. 1 is an illumination augmentation system that includes the single camera 30 and the three electronic flash devices 20A through 20C, the number of electronic flash devices may not be three; it could be some number different from three, for example five; and it could also be one.

Figure 2:
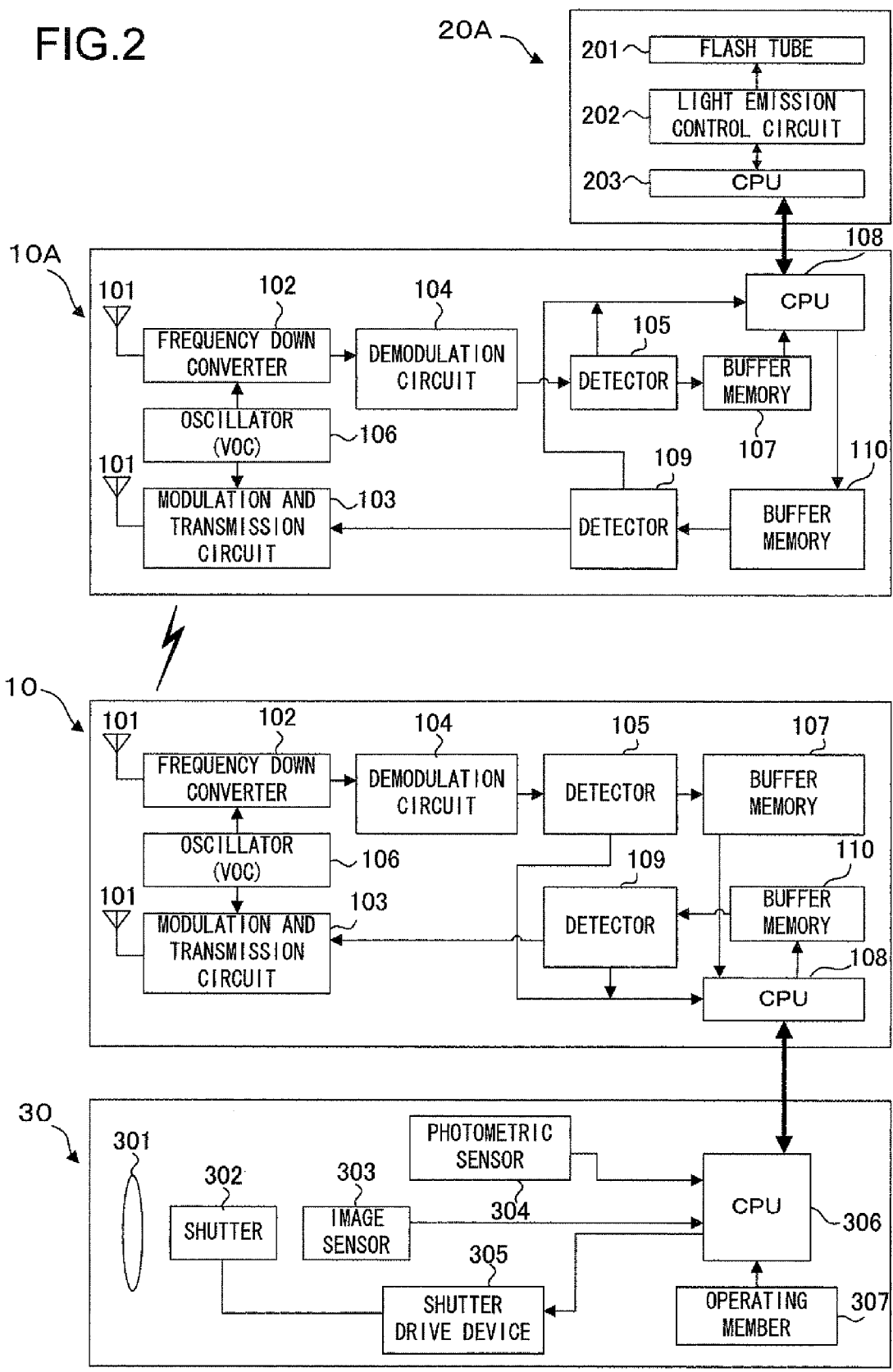
FIG. 2 is a block diagram showing examples of the structures of a camera, a master wireless adapter, a remote wireless adapter, and an electronic flash device.

FIG. 2 is a block diagram showing examples of the structures of the camera 30, the master wireless adapter 10, the remote wireless adapter 10A, and the electronic flash device 20A. Since the master wireless adapter 10 and the remote wireless adapter 10A have the same structure, accordingly the same reference symbols will be appended to corresponding blocks of both of these wireless adapters.

Moreover, although this is not shown in the figures, the structures of the remote wireless adapter 10B and of the electronic flash device 20B, and the structures of the remote wireless adapter 10C and of the electronic flash device 20C, are respectively the same as the structures of the remote wireless adapter 10A and of the electronic flash device 20A.

In FIG. 2, the electronic flash device 20A includes a flash tube 201 such as a xenon tube or the like, a light emission control circuit 202, and a CPU 203. Moreover, each of the remote wireless adapter 10A and the master wireless adapter 10 includes an antenna 101, a frequency down converter 102, a modulation and transmission circuit 103, a demodulation circuit 104, detectors 105 and 109, an oscillator 106, buffer memories 107 and 110, and a CPU 108.

The camera 30 includes a photographic lens 301, a shutter 302, an image sensor 303, a photometric sensor 304, a shutter drive device 305, a CPU 306, and an operating member 307 (including a shutter release switch).

The communication performed by the photography system described above will now be explained with reference to FIG. 3.

—Wired Communication #1—

Figure 3:
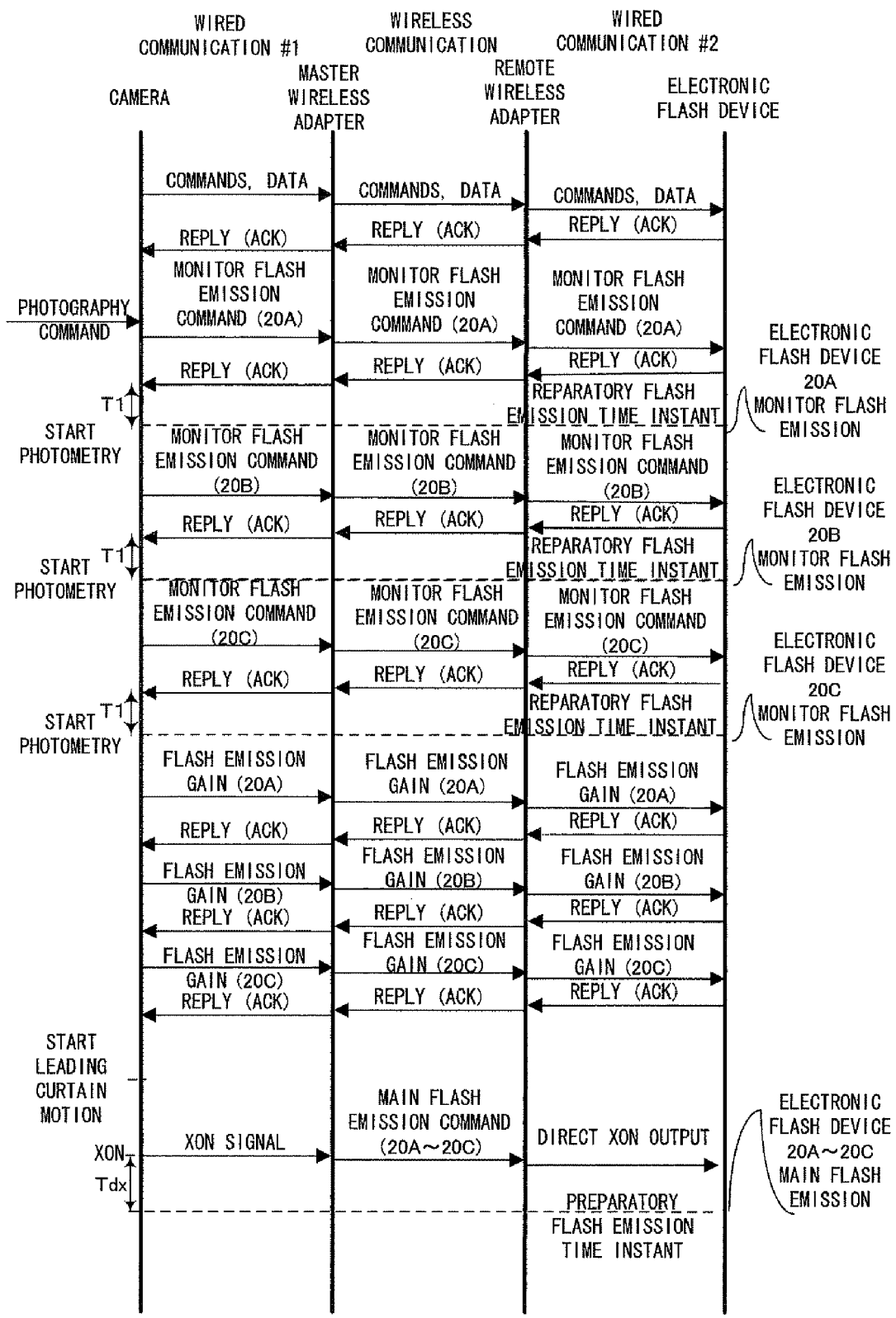
FIG. 3 is a figure for explanation of communication performed by this photography system.

The wired communication #1 on the left side in FIG. 3 shows wired communication that the camera 30 performs with the master wireless adapter 10, and is performed via terminals not shown in the figures that are provided to the accessory shoe. The camera 30 performs this wired communication #1 as appropriate, according to requirements.

Normally, in communication between the camera 30 and the master wireless adapter 10, the camera 30 transmits commands (for example, a monitor flash emission command, a flash emission gain command, a main flash emission command, and so on) and data to the master wireless adapter 10, and, upon receipt thereof, the master wireless adapter 10 replies to the camera 30 (ack). Commands for the electronic flash device 20A, commands for the electronic flash device 20B, and commands for the electronic flash device 20C are included in these commands.

—Wireless Communication—

The wireless communication at the center in FIG. 3 shows wireless communication that the master wireless adapter 10 performs with the remote wireless adapter 10A (or the remote wireless adapter 10B or the remote wireless adapter 10C). This wireless communication is performed directly after the wired communication #1 between the master wireless adapter 10 and the camera 30.

Here, the frequency at which wireless communication takes place with each one of the remote wireless adapters is the same as the frequency at which the wired communication #1 takes place. In other words, after the wired communication #1, wireless communication with each of the remote wireless adapters is performed without any delay. Normally, in communication between the master wireless adapter 10 and the remote wireless adapter 10A (or 10B or 10C), the master wireless adapter 10 transmits the above described commands and data to the remote wireless adapter 10A (or 10B or 10C), and, upon receipt thereof, the remote wireless adapter 10A (or 10B or 10C) replies (ack) to the master wireless adapter 10. Commands for the electronic flash device 20A (or 20B or 20C) installed to the remote wireless adapter 10A (or 10B or 10C) that is the opposite party to the communication are included in these commands.

—Wired communication #2—

The wired communication #2 on the right side in FIG. 3 shows wired communication that each of the remote wireless adapters 10A (or 10B or 10C) performs with the electronic flash device 20A (or 20B or 20C), and is performed via terminals not shown in the figures that are provided to the accessory shoes. This wired communication #2 is performed directly after the wireless communication with the master wireless adapter 10.

Normally, in communication between the remote wireless adapter 10A (or 10B or 10C) and the electronic flash device 20A (or 20B or 20C), the remote wireless adapter 10A (or 10B or 10C) transmits the above described commands and data to the electronic flash device 20A (or 20B or 20C) that corresponds to that remote wireless adapter 10A (or 10B or 10C), and, upon receipt thereof, the electronic flash device 20A (or 20B or 20C) replies (ack) to that remote wireless adapter 10A (or 10B or 10C). Commands for the electronic flash device 20A (or 20B or 20C) that is installed to the remote wireless adapter 10A (or 10B or 10C) are included in these commands.

<Light Emission Control>

An example of the light emission control that is performed in this embodiment will now be explained. Light emission control is performed during monitor flash emission in order to synchronize the timing of flash emission by the electronic flash device 20A (or 20B or 20C) and the timing of photometry by the photometric sensor 304, and during main flash emission in order to synchronize the timing of flash emission by the electronic flash device 20A (or 20B or 20C) and the timing of image capture by the image sensor 303.

Here, "synchronization" means adjustment of the timings of execution of a plurality of processes to standard points upon the time axis, and includes cases in which a plurality of processes are always performed with predetermined time differences being provided between them, and cases in which a plurality of processes are always performed simultaneously.

—Control During the Main Flash Emission—

Figure 4:
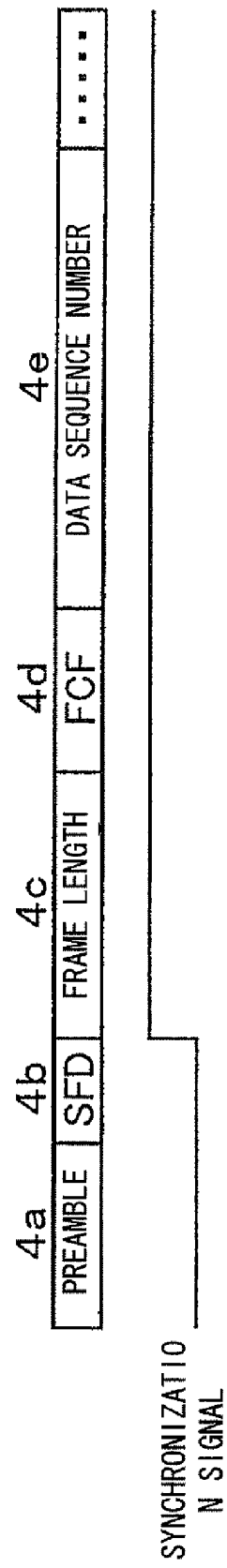
FIG. 4 is a figure for explanation of a communication packet.

During the main flash emission, synchronization is established between the timing of the main flash emission that is performed by the electronic flash devices 20A through 20C and the timing of the image capture that is performed by the camera 30. For this, on the basis of a main flash emission command signal from the CPU 306 of the camera 30, the CPU 108 of the master wireless adapter 10 issues commands for main flash emissions to the remote wireless adapters 10A (and 10B and 10C). At this time, a communication packet is generated according to a digital communication format that includes a signal (synchronization data) for establishing synchronization of the main flash emission timing and control information that specifies the details of control. For example, the CPU 108 may generate a communication packet of a format like the one shown in FIG. 4. In FIG. 4, a preamble 4a is data like a lead-in portion that is transmitted at the start of communication, and transmission of such a preamble 4a of around four bytes is compulsorily required. In this preamble 4a, for example, a fixed bit pattern like 0,0,0,0 may be set.

Figure 5:
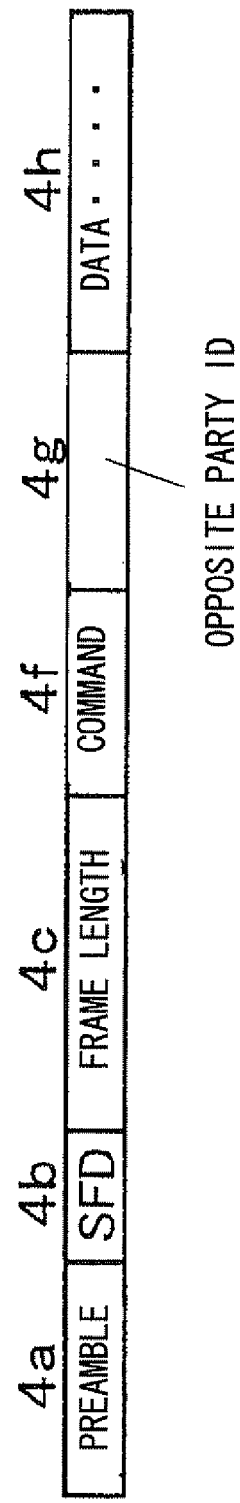
FIG. 5 is a figure showing an example of a communication packet according to this embodiment.

An SFD (Start of Frame Delimiter) 4b is data for synchronization that is appended to the head portion of the packet after the preamble 4a. And a frame length 4c is data that specifies a communication data amount (i.e. a number of bytes). After this, in the standard, a two-byte FCF (Frame Control Field) 4d and a one-byte data sequence number 4e are appended next. However, since it is possible to implement overall communication in practice even while not being in perfect conformity with the standard, in this embodiment, this FCF 4d and Data Sequence Number 4e are omitted, and, as shown in FIG. 5, a one-byte command 4f that is defined intrinsically to the system, a one-byte opposite party ID 4g, and data 4h including information of various types are appended instead.

The SFD 4b is, in principle, fixed data that is characteristic of the communication format, and operates to prevent erroneous operation when signal interference with other communication is present. In other words if, on the receive side, a communication packet has been received that includes an SFD for which the pattern of the data does not agree with that of an SFD that is set in advance, then it is decided that this packet is not a packet that can be received by itself.

In this embodiment, each of the CPU 306 of the camera 30, the CPU 108 of the master wireless adapter 10, the CPU 108 of the remote wireless adapter 10A, the CPU 108 of the remote wireless adapter 10B, the CPU 108 of the remote wireless adapter 10C, the CPU 203 of the electronic flash device 20A, the CPU 203 of the electronic flash device 20B, and the CPU 203 of the electronic flash device 20C, while using the SFD 4b with the objective of preventing erroneous operation during this kind of signal interference, also uses it as synchronization data for establishing synchronization between the timing of main flash emission by the electronic flash device 20A, the timing of main flash emission by the electronic flash device 20B, the timing of main flash emission by the electronic flash device 20C, and the timing of opening of the shutter 302 by the camera 30, as described above.

—Control During the Monitor Flash Emission—

On the other hand, during the monitor flash emission, synchronization is established between the timing of the monitor flash emission that is performed by the electronic flash device 20A (or 20B or 20C) and the timing of the photometry that is performed by the camera 30. For this, on the basis of a monitor flash emission command signal from the CPU 306 of the camera 30, the CPU 108 of the master wireless adapter 10 issues a command for monitor flash emission to the remote wireless adapters 10A (or 10B or 10C). Upon receipt of this command, as a reply (ack) to the master wireless adapter 10, the remote wireless adapter 10A (or 10B or 10C) generates a communication packet according to a digital communication format that includes an SFD 4b. In the communication packet during reply as well, the SFD 4b is used as synchronization data for establishing synchronization between the timing of monitor flash emission by the electronic flash device 20A (or 20B or 20C) and the timing of photometry by the photometric sensor 304 of the camera 30.

The command 4f is data specifying a control command for starting processing. For example, data specifying a main flash emission start command may be appended as the command 4f to the communication packet (the main flash emission start packet) that commands the execution of the main flash emission described above. Moreover, data specifying a monitor flash emission start command is appended as the command 4f to the communication packet (the monitor flash emission start packet) that commands the execution of the monitor flash emission described above. And the opposite party ID 4g includes the ID of the electronic flash device 20A (or 20B or 20C) that is the subject for execution of the control command defined by the command 4f. In other words, it commands the electronic flash device 20A (or 20B or 20C) that is specified by the opposite party ID 4g to execute the control command that is defined by the command 4f.

Here, an ID (an individual ID) is assigned individually to each of the electronic flash devices 20A through 20C, and it is possible to identify each of the electronic flash devices 20A through 20C uniquely by this individual ID. Accordingly, it is possible to designate the subject for execution of the command 4f by specifying this individual ID in the opposite party ID 4g.

Furthermore, instead of these individual IDs, it is also possible to specify an ID (an all-device ID) for designating all of the electronic flash devices 20A through 20C together as subjects for execution of the command 4f. For example, if the individual IDs of the three electronic flash devices 20A through 20C shown in FIG. 1 are 1 through 3 respectively, then it is possible to specify 0 as an all-device ID when designating them all together.

Due to this, when it is desired to cause all of the electronic flash devices 20A through 20C to execute the same command 4f (such as starting main flash emission or the like), then it is possible to command all of the electronic flash devices 20A through 20C to execute the control command defined by the command 4f together by designating the all-device ID in the opposite party ID 4g. On the other hand, when it is desired to cause the electronic flash devices 20A through 20C to execute commands 4f individually (such as starting monitor flash emission or the like), then it is possible to command the electronic flash devices 20A through 20C to execute the control commands defined by the commands 4f by designating the individual IDs in the opposite party IDs 4g. It is recognized by each of the electronic flash devices 20A through 20C that have received communication packets in this manner that the subject for execution of the control command defined by the command 4f is itself, if its own individual ID is included in the opposite party ID 4g, or if the all-device ID is included therein.

Mode information, time information, and check data and so on are included as types for the data 4h. The mode information is information specifying an operational mode such as main flash emission or monitor flash emission or the like. The time information is information related to a predetermined interval from the synchronization signal being outputted to the start of processing. And the check data is data for error checking such as a checksum or a CRC or the like, for prevention of erroneous operation.

—Processing on the Side of the Camera and the Master Wireless Adapter During the Monitor Flash Emission—

The processing performed during the monitor flash emission by the camera 30 and the master wireless adapter 10 using the communication packets described above will now be explained with reference to FIG. 2. Communication packets (in this case, monitor flash emission start packets) are transmitted individually to each of the electronic flash devices 20A through 20C. After the CPU 306 of the camera 30 has detected depression operation of the release switch 307 by the user (i.e. a photography command) and has initiated the photographic sequence, it issues a monitor flash emission command to the master wireless adapter 10 (wired communication #1). And, on the basis of this signal (the monitor flash emission command) from the camera 30, the CPU 108 of the master communication adapter 10 issues commands for monitor flash emissions to the remote wireless adapters 10A through 10C (wireless communication). At this time, communication packets are generated for establishing synchronization of the timings of the monitor flash emissions.

After the communication packet that has been generated by the CPU 108 of the master communication adapter 10 has been temporarily stored in the buffer memory 110 of the master wireless adapter 10, it is outputted to the detector 109. The detector 109 reads in and analyzes the inputted packet from its head end. And, when the detector 109 has detected that the reading in of the SFD 4b that serves as synchronization data has been completed, it outputs a synchronization signal to the CPU 108. In other words, the detector 109 detects the synchronization data before the transmission of the communication packet is completed. The detector 109 outputs this synchronization signal to a pin of the CPU 108 for synchronization timing (i.e. an interrupt terminal) as an interrupt signal. And the CPU 108 outputs a synchronization interrupt signal to the CPU 306 of the camera 30.

Each of the CPU 108 of the master wireless adapter 10 and the CPU 306 of the camera 30 starts counting time when it has detected its synchronization signal interrupt. And, on the basis of the command 4f included in the communication packet that has been generated, the CPU 108 of the master wireless adapter 10 decides whether or not it is necessary for the electronic flash device 20A (or 20B or 20C) and the camera 30 to establish synchronization of their starts of processing. As a concrete example, the case in which the command 4f is data that specifies the monitor flash emission command will be explained.

As described above, synchronization is established between the monitor flash emission timing and the timing of photometry by the camera 30. Accordingly, if the command 4f specifies a monitor flash emission command, then the CPU 108 decides that it is necessary to establish synchronization of the starts of processing, since this corresponds to the case described above of establishing synchronization.

Having decided that it is necessary to synchronize the starts of processing, the CPU 108 of the master wireless adapter 10 starts the required processing on the basis of the command 4f after a predetermined time period set in advance from detection of the synchronization signal interrupt from the detector 109. For example, if the command 4f is data that specifies a monitor flash emission command, then, after a first predetermined time period has elapsed from detection of the above described synchronization signal interrupt, the CPU 108 sends to the remote wireless adapter 10A (or 10B or 10C) a communication packet (a monitor flash emission command by wireless communication) that commands the start of monitor flash emission by the electronic flash device 20A (or 20B or 20C) that is installed thereto.

The communication packet is outputted from the detector 109 of the master wireless adapter 10 to the modulation and transmission circuit 103, and, after the communication packet has been modulated by the modulation and transmission circuit 103 to a signal that can be wirelessly transmitted upon a predetermined frequency, it is are transmitted to the remote wireless adapter 10A (or 10B or 10C) via the antenna 101 in the form of a carrier wave. This predetermined frequency is determined by the oscillator 106.

On the other hand, upon receipt of the synchronization interrupt signal from the master wireless adapter 10, the CPU 306 of the camera 30 waits for a reply packet from the remote wireless adapter 10A (or 10B or 10C). And the camera 30 acquires photometric data from the photometric sensor 304 after a second predetermined time period has elapsed from detection of the synchronization signal interrupt outputted from the detector 105 of the master wireless adapter 10 that has received the replay packet and inputted to the camera 30 via the CPU 108 of the master wireless adapter 10. Due to this, it is possible to establish synchronization of the processing timings between the electronic flash devices 20A (or 20B or 20C) and the camera 30 at high accuracy. The time interval information that is the basis of the second predetermined time period is included in the communication packet that the remote wireless adapter 10A (or 10B or 10C) returns as a reply to the master wireless adapter 10 (the data 4h).

—Processing on the Side of the Remote Wireless Adapters and the Electronic Flash Devices During the Monitor Flash Emission—

The processing performed during the monitor flash emission by the remote wireless adapter 10A (or 10B or 10C) and by the electronic flash devices 20A (or 20B or 20C) using the communication packet described above will now be explained. The remote wireless adapter 10A (or 10B or 10C) receives the communication packet via the antenna 101 in the form of a carrier wave. The carrier wave that has been received is first inputted to the frequency down converter 102. After having down converted the packet that it has received into data at a predetermined low frequency, the frequency down converter 102 outputs the result to the demodulation circuit 104. This predetermined frequency is determined by the oscillator 106. The signal that has been inputted is demodulated by the demodulation circuit 104 to a digital communication packet, and is outputted to the detector 105.

In a similar manner to the detector 109 of the master wireless adapter 10 described above, the detector 105 of the remote wireless adapter 10A (or 10B or 10C) reads in and analyzes the packet that is inputted from its head end, and, when it has detected that the reading in of the SFD 4b that serves as the synchronization data has been completed, it outputs the synchronization signal described above as an interrupt signal to a pin for synchronization timing of the CPU 108. At this time, the detector 105 only outputs the synchronization signal when the SFD 4b that has been read in and a data string set in advance agree with one another. By doing this, it is possible to prevent erroneous operation when signal interference with other communication is occurring.

Moreover, the detector 105 of the remote wireless adapter 10A (or 10B or 10C) outputs the communication packet that has been read in to the buffer memory 107 and records it there.

And, on the basis of the command 4f included in the packet stored in the buffer memory 107, the CPU 108 of the remote wireless adapter 10A (or 10B or 10C), along with outputting a signal (a monitor flash emission command by the wired communication #2) commanding the start of monitor flash emission to the electronic flash device 20A (or 20B or 20C), also transmits a reply packet to the master wireless adapter 10.

The transmission of the reply packet is as follows. The CPU 108 of the remote wireless adapter 10A (or 10B or 10C) generates a reply packet for synchronization of the timings of monitor flash emission. This reply packet that has been generated by the CPU 108 of the remote wireless adapter 10A (or 10B or 10C) is outputted to the detector 109 after having been temporarily stored in the buffer memory 110. The detector 109 reads in and analyzes the packet that is inputted from its head end. And, when the detector 109 has detected that the reading in of the SFD 4b, that serves as synchronization data, has been completed, then it outputs a synchronization signal to the CPU 108. In other words, the detector 109 detects the synchronization data before the transmission of the reply packet has been completed. The detector 109 outputs this synchronization signal to the pin for synchronization timing (i.e. the interrupt terminal) of the CPU 108 as an interrupt signal. And the CPU 108 outputs a synchronization interrupt signal to the CPU 203 of the electronic flash device 20A (or 20B or 20C).

Each of the CPU 108 of the remote wireless adapter 10A (or 10B or 10C) and the CPU 203 of the electronic flash device 20A (or 20B or 20C) starts timing when it has detected the synchronization signal interrupt. And, on the basis of the command 4f included in the reply packet that has been generated, the CPU 108 of the remote wireless adapter 10A (or 10B or 10C) decides that it is necessary to establish synchronization of the starts of processing by the electronic flash device 20A (or 20B or 20C) and the camera 30.

Having decided that it is necessary to establish synchronization of the starts of processing, the CPU 108 starts the necessary processing on the basis of the command 4f after a predetermined time period set in advance from detection of the synchronization signal interrupt from the detector 109. Since the command 4f is data specifying a monitor flash emission command, the CPU 108, along with commanding the CPU 203 of the electronic flash device 20A (or 20B or 20C) to start monitor flash emission, also commands transmission of a reply packet after a fifth predetermined time period has elapsed from detection of the synchronization signal interrupt from the detector 109.

The reply packet is outputted from the detector 109 of the remote wireless adapter 10A (or 10B or 10C) to the modulation and transmission circuit 103, and, after this reply packet has been modulated by the modulation and transmission circuit 103 into a signal of a predetermined frequency that can be wirelessly transmitted, it is transmitted to the master wireless adapter 10 via the antenna 101 in the form of a carrier wave. This predetermined frequency is determined by the oscillator 106.

In FIG. 3, if the start timing of the monitor flash emission is taken as being the "arranged flash emission time instant", then the second predetermined time period corresponds to "T1". The CPU 306 of the camera 30 times the above described second predetermined time period from detection of the interrupt of the synchronization signal until the photometric data is acquired, so as to acquire photometric data that is matched to the "arranged flash emission time instant". It should be understood that the time period "T1" is a value (the data 4h) included in the above described reply (ack) communication packet that takes into account the delay interval after the wired communication #2 until the wireless communication is performed and the delay interval after the wireless communication until the wired communication #1 is performed.

—Processing on the Side of the Camera and the Master Wireless Adapter During the Main Flash Emission—

The processing performed during the main flash emission by the camera 30 and the master wireless adapter 10 using the communication packets described above will now be explained. Communication packets (in this case, main flash emission start packets) are transmitted at the same time to each of the electronic flash devices 20A through 20C. The CPU 108 of the master communication adapter 10 issues commands for main flash emission to the remote wireless adapters 10A through 10C on the basis of a signal from the camera 30 (a so called XON signal). At this time, communication packets are generated for establishing synchronization between the timings of the main flash emissions. The structure and function of these communication packets is the same as in the case of the monitor flash emissions described above.

As described above, synchronization is established between the main flash emission timing and the opening timing of the shutter 302 of the camera 30. Accordingly, when the command 4f specifies a main flash emission command, the CPU 108 decides that it is necessary to perform synchronization of the starts of processing, since this corresponds to the case of establishing the above described synchronization.

Having decided that it is necessary to synchronize the starts of processing, the CPU 108 starts the processing required on the basis of the command 4f after a predetermined time period set in advance from detection of the synchronization signal interrupt from the detector 109. For example, if the command 4f is data that specifies a main flash emission command, then the CPU 108 sends communication packets (main flash emission commands by wireless communication) to the remote wireless adapters 10A through 10C commanding the start of the main flash emissions by the electronic flash devices 20A through 20C that are installed thereto, after a third predetermined time period has elapsed from detection of the interrupt of the synchronization signal described above.

On the other hand, the CPU 306 of the camera 30 issues a command (for starting leading curtain motion) to the shutter drive device 305 so as to open the shutter 302, at a fourth predetermined time period before the time point at which the XON signal described above is issued. Due to this, it is possible to establish synchronization between the processing timings of the electronic flash devices 20A through 20C and of the camera 30 at high accuracy. It should be understood that it would also be acceptable for the shutter 302 that is provided to the camera 30 not to be a mechanical shutter, but to be an electronic shutter of the image sensor 303.

—Processing on the Side of the Remote Wireless Adapters and the Electronic Flash Devices During the Main Flash Emission—

The processing performed during the main flash emission by the remote wireless adapters 10A through 10C and by the electronic flash devices 20A through 20C using the communication packets described above will now be explained. The remote wireless adapters 10A through 10C receive the communication packets transmitted from the master wireless adapter 10. And, in a similar manner to the case during the monitor flash emission, the detectors 105 of the remote wireless adapters 10A through 10C read in and analyze the corresponding packets from their head ends, and, when they have detected that reading in of the SFDs 4b that serve as synchronization data has been completed, output synchronization signals to the pins for synchronization timing of the CPUs 108 as synchronization signals. The feature that the synchronization signals are only outputted if the SFDs 4b that have been read in agree with data strings that have been set in advance is the same as in the case of the monitor flash emission.

Moreover, the detectors 105 of the remote wireless adapters 10A through 10C output the communication packets that have been read in to the buffer memories 107, and store them therein. And, on the basis of the commands 4f included in the packets stored in the respective buffer memories 107, the CPUs 108 of the remote wireless adapters 10A through 10C output signals to the electronic flash devices 20A through 20C commanding the start of main flash emission (direct XON output by the wired communication #2).

As described above, during the main flash emission, along with synchronization being established between the timing of transmission of communication packets by the master wireless adapter 10 to the remote wireless adapters 10A through 10C all together and the timing at which the camera 30 opens the shutter 302, the remote wireless adapters 10A through 10C that have received these communication packets from the master wireless adapter 10 output signals to the electronic flash devices 20A through 20C commanding the starts of the respective flash emissions on the basis of the communication packets that have been received. Since the electronic flash devices 20A through 20C start their main flash emissions all together due to the all-device ID being specified, accordingly it is possible to establish synchronization between the timing at which the camera 30 opens the shutter 302 and the timings of the main flash emissions by the electronic flash devices 20A through 20C.

In FIG. 3, if the start timing of the main flash emission is taken as being the "arranged flash emission time instant", then the time period from the time of dispatch of the signal from the CPU 306 of the camera 30 (i.e. of the command for the main flash emission=the XON signal) to the "arranged flash emission time instant" corresponds to the light emission delay interval "Tdx". The CPU 306 of the camera 30 issues the XON signal after a fourth predetermined time period from the command for starting motion of the leading curtain of the shutter 302, so that the opening of the shutter 302 is matched to the "arranged flash emission time instant". It should be understood that the light emission delay interval "Tdx" is set in advance as a constant value, so as to include the delay interval after the wired communication #1 until the wireless communication is performed, the delay interval after the wireless communication until the wired communication #2 is performed, and the delay interval after the wireless communication #2 until the electronic flash devices 20A (20B and 20C) perform main flash emission.

In the above explanation, since a delay interval (a reception delay interval) occurs on the reception side of the communication packet (the reply packet) as compared to the transmission side due to the time period required for decoding, accordingly there is a possibility that the timing A of completion of reception of the SFD 4b on the reception side is delayed more than the timing B of completion of transmission of the SFD 4b on the transmission side, so that they do not agree perfectly with one another. However, this delay interval is no problem and may be ignored, since it is an extremely short time period as compared to the time period for emission of light by the electronic flash devices 20A through 20C. Furthermore, even if a delay interval is present at a level that cannot be ignored, this delay interval can be set in advance as a fixed value since it is an almost constant time period, and the timings of processing on the transmission side and on the reception side may be made to agree with one another by adjusting the timing of execution of the command defined in the command 4f in consideration of this delay interval.

It should be understood that while, in this embodiment, a method has been explained of making the timings of processing on the transmission side and on the reception side agree with one another on the basis of the timings A and B of completion of transmission and reception of the SFD 4b agree with one another, it would also be acceptable to arrange to make the timings of starting processing on the transmission side and on the reception side agree with one another on the basis of the timings of completion of transmission and reception of the frame length 4c.

The flow of processing executed by the CPU 306 of the camera 30 will now be explained with reference to the flow chart shown by way of example in FIG. 6. The CPU 306 starts the processing according to FIG. 6 when, in photography using the external flash devices 20A (and 20B and 20C), a photography command is issued. In a step S101 of FIG. 6, the CPU 306 transmits a monitor flash emission command to the master wireless adapter 10, and then the flow of control proceeds to a step S102. This monitor flash emission command sends commands in order to each of the remote wireless adapters 10A (10B, 10C). Then in a step S102 the CPU 306 makes a decision as to whether or not a timeout is occurring. If the CPU 306 has received data from the master wireless adapter 10 to the effect that a failure has occurred in communication (i.e. information obtained by timeout processing that will be described hereinafter), then an affirmative decision is reached in this step S102, and the flow of control is transferred to a step S118. But if the CPU 306 has not received data from the master wireless adapter 10 to the effect that a failure has occurred in communication, then a negative decision is reached in this step S102, and the flow of control proceeds to a step S103.

In the step S103, the CPU 306 makes a decision as to whether or not a reply (ack) has been received from the master wireless adapter 10. And, if a reply (ack) has been received from the master wireless adapter 10, then the CPU 306 reaches an affirmative decision in this step S103, and the flow of control proceeds to a step S104. But if no reply (ack) has been received from the master wireless adapter 10, then the CPU 306 reaches a negative decision in this step S103, and the flow of control returns to the step S102. When the flow of control thus returns to the step S102, the system waits for a reply (ack) from the master wireless adapter 10.

In the step S104, the CPU 306 waits for a predetermined time period (the second predetermined time period described above), and then the flow of control proceeds to a step S105. In this step S105, the CPU 306 performs photometry during monitor flash emission, and then the flow of control proceeds to a step S106. In concrete terms, the CPU 306 acquires photometric data from the photometric sensor 304 and performs a predetermined calculation. This photometry during monitor flash emission is performed while making the electronic flash devices 20A through 20C perform monitor flash emission in order.

In the step S106, the CPU 306 calculates the main flash emission gains on the basis of the photometric results described above, and then the flow of control proceeds to a step S107. In this step S107, the CPU 306 transmits the main flash emission gains to the master wireless adapter 10, and then the flow of control proceeds to a step S108. These main flash emission gains are sent in order to each of the electronic flash devices 20A through 20C.

In a step S108, the CPU 306 makes a decision as to whether or not a timeout is occurring. If the CPU 306 has received data from the master wireless adapter 10 to the effect that a failure has occurred in communication (i.e. information obtained by timeout processing that will be described hereinafter), then an affirmative decision is reached in this step S108, and the flow of control is transferred to the step S118. But if the CPU 306 has not received data from the master wireless adapter 10 to the effect that a failure has occurred in communication, then a negative decision is reached in this step S108, and the flow of control proceeds to a step S109.

In the step S109, the CPU 306 makes a decision as to whether or not a reply (ack) has been received from the master wireless adapter 10. And, if a reply (ack) has been received from the master wireless adapter 10, then the CPU 306 reaches an affirmative decision in this step S109, and the flow of control proceeds to a step S110. But if no reply (ack) has been received from the master wireless adapter 10, then the CPU 306 reaches a negative decision in this step S109, and the flow of control returns to the step S108. When the flow of control thus returns to the step S108, the system waits for a reply (ack) from the master wireless adapter 10.

In the step S110, the CPU 306 starts exposure sequence processing, and then the flow of control proceeds to a step S111. Due to this, the shutter drive device 305 performs per se known motion driving of the shutter blades (a leading curtain and a trailing curtain) and the image sensor 303 starts its accumulation action. In the step S111, the CPU 306 performs waiting for detection of an XON signal, and, when an XON signal is detected, in a step S112 it transmits a main flash emission command to the master wireless adapter 10, and then the flow of control proceeds to a step S113. This XON signal is a signal that indicates the fully open timing of the shutter 302, and may, for example, be outputted from a sequence device not shown in the figures.

In the step S113, the CPU 306 makes a decision as to whether or not the remote wireless adapters 10A (10B, 10C) have transmitted main flash emission commands. If data has been received by the CPU 306 to the effect that each of the remote wireless adapters 10A (10B, 10C) has transmitted a main flash emission command to its corresponding electronic flash device 20A (20B, 20C), then the CPU 306 reaches an affirmative decision in this step S113, and the flow of control proceeds to a step S114. But if, for at least one of the remote wireless adapters, data has not been received to the effect that a main flash emission command has been transmitted, then the CPU 306 reaches a negative decision in this step S113, and the flow of control is transferred to a step S120.

In the step S114, the CPU 306 performs enquiry about execution of the main flash emissions, and then the flow of control proceeds to a step S115. This main flash emissions query corresponds to a request to each of the electronic flash devices for data that specifies that its main flash emission has actually been performed. Each of the electronic flash devices 20A through 20C returns data specifying the actual amount of light that it has emitted via its remote wireless adapter 10A (10B, 10C) and via the master wireless adapter 10.

In a step S115, the CPU 306 waits for data transmitted from each of the electronic flash devices 20A through 20C in order, and then the flow of control proceeds to a step S116. In this step S116, if the data received from at least one of the electronic flash devices shows that it has not performed its main flash emission, or if data has not been received from at least one of the electronic flash devices, then the CPU 306 reaches an affirmative decision in the step S116 and the flow of control is transferred to a step S120. But if data has been received from all of the electronic flash devices 20A through 20C, and moreover this data shows that all of the electronic flash devices 20A through 20C have performed their main flash emissions, then the CPU 306 reaches a negative decision in the step S116, and the flow of control proceeds to a step S117.

In the step S117, the CPU 306 makes a decision as to whether or not there is at least one of the electronic flash devices that has performed full flash emission (i.e. that has emitted its maximum amount of light). If the data received from at least one of the electronic flash devices shows that it has performed full flash emission, then the CPU 306 reaches an affirmative decision in this step S117, and the flow of control is transferred to a step S121. But if not even one of the electronic flash devices has performed full flash emission, then the CPU 306 reaches a negative decision in this step S117 and the processing shown in FIG. 6 terminates.

In the step S118 to which the timeout decisions described above lead (i.e. the decisions in the steps S102 and S108), the CPU 306 changes over to non-flash control, and then the flow of control proceeds to a step S119. Since, in this case, photography is performed without emitting any light from the electronic flash devices 20A through 20C, accordingly the ISO speed is increased, so that compensation is performed for the insufficiency of light. In the step S119 the CPU 306 starts exposure sequence processing, and then the processing shown in FIG. 6 terminates.

Figure 6:
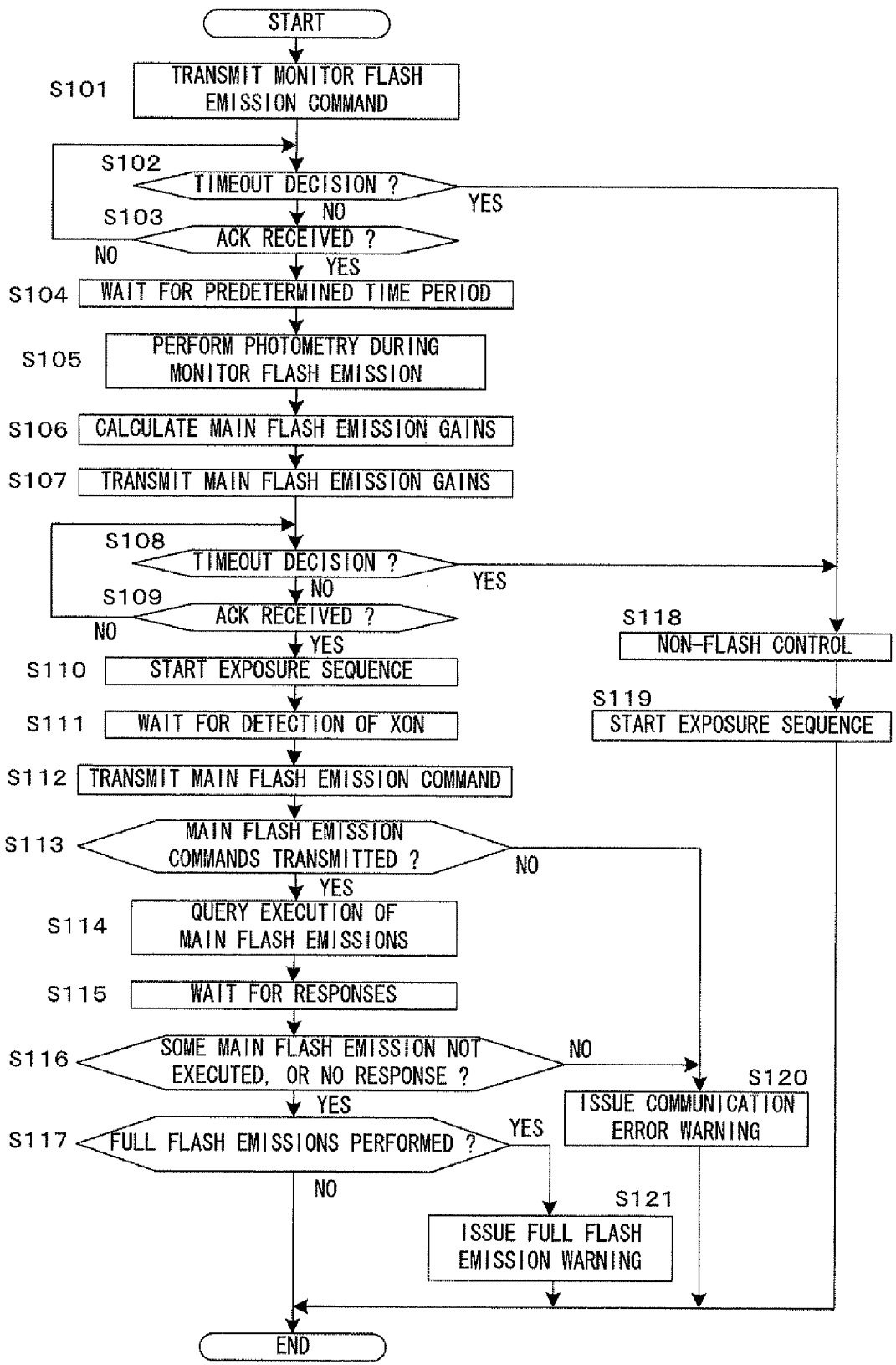
FIG. 6 is a flow chart for explanation of a processing flow executed by a CPU of the camera.

In a step S120 that follows from the steps S113 and S116 described above, the CPU 306 issues a communication error warning, and then the processing shown in FIG. 6 terminates. This communication error warning is performed by providing a display upon a display device not shown in the figures to the effect that communication is not possible, or by emitting a warning sound from a speaker not shown in the figures.

In a step S121 that follows from the step S117 described above, the CPU 306 issues a full flash emission warning, and then the processing shown in FIG. 6 terminates. This full flash emission warning is performed by providing a display upon a display device not shown in the figures to the effect that there is a possibility that the amount of light may be insufficient, or by emitting a warning sound from a speaker not shown in the figures.

—The Timeout Processing—

Since the wired communication #1 and the wired communication #2 described above are performed between devices that are directly connected together via accessory shoes, accordingly failures in communication do not occur in the normal usage mode. By contrast, in the wireless communication described above, if for example the remote wireless adapter 10A (i.e. the electronic flash device 20A) undesirably is removed to out of the range over which the camera 30 (i.e. the master wireless adapter 10) can perform communication therewith, or if it experiences some influence from radio waves (i.e. noise) generated by some other device, then sometimes it may happen that the remote wireless adapter 10A is not able to receive commands from the camera 30 (i.e. from the master wireless adapter 10), or that the camera 30 (i.e. the master wireless adapter 10) is not able to receive replies from the remote wireless adapter 10A.

Therefore, in this embodiment, the following type of timeout processing is performed. That is, if the master wireless adapter 10 is not able to receive any reply from the remote wireless adapter 10A (10B, 10C) that is the recipient of a monitor flash emission command even though some predetermined time period (for example 30 msec) has elapsed, then it transmits the monitor flash emission command, or the main flash emission gain, for which this communication has failed, again for a second time to the remote wireless adapter 10A (10B and 10C).

This type of transmission for a second time (i.e. retrying) is performed a predetermined number of times (for example, two times), and if it is not possible to receive any reply from the remote wireless adapter 10A (10B, 10C) even though retrying has been performed the predetermined number of times, then it is decided that communication with the remote wireless adapter 10A (10B, 10C) is not possible, and the retrying is terminated. And, if the master wireless adapter 10 has thus decided that communication is not possible, then, when a request for data related to that remote wireless adapter (i.e. related to that electronic flash device) arrives from the camera 30, the master wireless adapter 10 sends data to the camera 30 including information to the effect that a failure in communication has occurred.

According to the embodiment explained above, the following operational benefits are obtained.

(1) In the photographic system that includes the camera 30, the electronic flash device 20A, the master wireless adapter 10 that is provided to the side of the camera 30, and the remote wireless adapter 10A that is provided to the electronic flash device 20A, it is arranged: to wirelessly transmit from the master wireless adapter 10 to the remote wireless adapter 10A a monitor flash emission command that commands, from the side of the camera 30 to the side of the electronic flash device 20A, a preparatory flash emission (pre-flash emission) that precedes a main flash emission during photography; to wirelessly transmit from the remote wireless adapter 10A to the master wireless adapter 10 a reply (ack) that includes flash emission timing information of the preparatory flash emission, and that carries information, from the side of the electronic flash device 20A to the side of the camera 30, to the effect that the monitor flash emission command has been received; and for the camera 30 to start photometric processing during the preparatory flash emission on the basis of the flash emission timing information. Since, due to this, the timings of the monitor flash emission and of the photometry thereof are matched together, accordingly it is possible to perform the monitor flash emission and the photometry thereof in an appropriate manner.

(2) Since it is arranged for the flash emission timing information to include information about the time difference from a synchronization signal in the reply (ack) until the preparatory flash emission is started, accordingly it is possible to provide information about the timing of the above described monitor flash emission.

(3) Since the flash emission timing information includes information about the time difference from a synchronization signal in the reply (ack) until the preparatory flash emission is started, and information about the light emission interval of the preparatory flash emission, accordingly it is possible to provide information about the timing and the period of the above described monitor flash emission.

(4) Since it is arranged, if the reply (ack) has not been received by the master wireless adapter 10 even after having waited a predetermined time period after wirelessly transmitting the monitor flash emission command, for the camera to wirelessly re-transmit the monitor flash emission command again, accordingly it is possible to enhance the possibility of proceeding to the next processing stage, and this is different from the case in which communication is undesirably abandoned after a single failure in communication.

(5) Since it is arranged to limit the wireless re-transmission of the monitor flash emission command to a predetermined number of times, accordingly it is possible to avoid useless communication, as compared to the case when such communication is continued without limit.

(6) Since, when a main flash emission command that commands, from the side of the camera 30 to the side of the electronic flash device 20A, main flash emission during photography is wirelessly transmitted from the master wireless adapter 10 to the remote wireless adapter 10A, it is arranged for the camera 30 to stop wireless transmission of the main flash emission command if the reply (ack) is not received by the master wireless adapter 10, irrespective of whether or not the monitor flash emission command was wirelessly re-transmitted, accordingly it is possible to avoid useless communication in a situation in which there is a possibility of communication failure.

(7) Since it is arranged to inform the user of at least one of the fact that no reply (ack) has been received by the master wireless adapter 10, and the fact that the main flash emission is not performed, accordingly it is possible to prevent the user from repeating actuation unknowingly.

(8) If there is some electronic flash device and remote wireless adapter group from which no reply has been received after wireless transmission of the monitor flash emission command, then it may be arranged for the camera 30 to perform photography using auxiliary photographic light from the other electronic flash devices with the exception of that electronic flash device group, or to perform photography without using auxiliary photographic light from any of the plurality of electronic flash device groups. By doing this it is possible to avoid unexpected failure of photography, since photography is performed while excluding the use of any electronic flash device for which there is a possibility of absence of light emission due to a communication failure.

<Variant Embodiment #1>

In the embodiment described above, an example was explained in which the camera 30 and the master wireless adapter 10 were connected together via an accessory shoe, and the remote wireless adapters 10A (10B, 10C) and the electronic flash devices 20A (20B, 20C) were also connected together via corresponding accessory shoes. Instead of this, it would also be acceptable to arrange to provide a unified structure, in which the structure of the master wireless adapter 10 is housed within the camera 30. Since, in this case, the wired communication #1 will be handled as internal processing within the camera 30, accordingly it will also be acceptable to arrange to omit the reply corresponding to the wired communication #1. In a similar manner, it would also be acceptable to arrange for the structures of the remote wireless adapters 10A (10B, 10C) to be provided as unified, so that these wireless adapters are housed within the corresponding electronic flash devices 20A (20B, 20C). Since, in this case, the wired communications #2 will be handled as internal processing within each of the electronic flash devices, accordingly it will also be acceptable to arrange to omit the replies corresponding to the wired communications #2.

<Variant Embodiment #2>

While, in the above explanation, the number of times for retry during timeout processing was limited to being two, it would also be acceptable to arrange for the number to be limited to any value from one to five. Moreover, it would also be acceptable to arrange for it to be zero times (so that retry is not permitted).

<Variant Embodiment #3>

It would also be acceptable to arrange to provide a warning display on the camera 30, or to emit a warning sound, if there is no reply even though retry has been performed a predetermined number of times. In this case, if data is received from the remote wireless adapter 10A (or 10B or 10C) including information to the effect that there has been a failure in communication, then the CPU 306 of the camera 30 will provide a display on a display device not shown in the figures to the effect that communication is not possible, or will emit a warning sound from a speaker not shown in the figures.

<Variant Embodiment #4>

In the above explanation it is arranged, if a timeout has occurred, to proceed (in the steps S118 and S119) to the photographic processing without causing any of the electronic flash devices 20A through 20C to emit light. Instead of this, it would also be acceptable to arrange to proceed to the photographic processing while only not causing that electronic flash device that corresponds to the communication in which the timeout has occurred to emit light, or to proceed to the photographic processing while causing only one representative electronic flash device (for example the flash device 20A) to emit light. If the system proceeds to the photographic processing while only not causing that electronic flash device that corresponds to the communication in which the timeout has occurred to emit light, then photography is performed while causing the other electronic flash devices for which no timeout has occurred to emit light. In this case, during the main flash emission, the amount of light emitted by the other electronic devices is raised or the like (or the ISO speed is enhanced), so that the absence of light from the electronic flash device that does not emit any light is compensated for. On the other hand, if the system proceeds to the photographic processing while causing only one representative electronic flash device (for example the flash device 20A) to emit light, then photography is performed while not causing any of the other electronic flash devices apart from that representative electronic flash device to emit light. In this case, during the main flash emission, the amount of light emitted by that representative electronic device is raised or the like (or the ISO speed is enhanced), so that the absence of light from the electronic flash devices that do not emit any light is compensated for.

<Variant Embodiment #5>

While an example has been explained in which, in the communication packet during reply described above, the time period "T1" is included in the time information in the data 4h, it would also be acceptable to include information that specifies a monitor flash emission interval (i.e. a time period). In this case, the camera 30 would control the photometric time period so as to include at least this monitor flash emission interval (time period). According to this variant embodiment #5, even if the monitor flash emission intervals due to the electronic flash devices 20A (20B, 20C) are different, monitor flash emission interval information is acquired from the remote wireless adapters 10A (10B, 10C), so that it is possible to control the photometric time period for photometric processing according to these flash emission intervals in an appropriate manner.

While an example has been explained in which electronic flash devices were used as the light sources for photographic illumination, it would also be acceptable to provide a system that uses LED light sources.

While various embodiments and variant embodiments have been explained in the above description, the present invention is not to be considered as being limited to the details thereof. Other modes that are considered to fall within the range of the technical concept of the present invention are also included within the scope of the present invention.

The content of the disclosure of the following application, upon which priority is claimed, is hereby included herein by reference:

Japanese Patent Application 2009-263627 (filed on Nov. 19, 2009).

The invention claimed is:

1. A photography system, comprising:
a camera that is electrically connected with a first communication unit; and
a photography illumination device that is electrically connected with a second communication unit, wherein:
the camera wirelessly transmits from the first communication unit to the second communication unit a first signal that commands, from the camera side to the photography illumination device side, a preparatory flash emission that precedes a main flash emission during photography;
the photography illumination device wirelessly transmits from the second communication unit to the first communication unit a second signal that includes flash emission timing information of the preparatory flash emission, and that carries information, from the photography illumination device side to the camera side, as to the effect that the first signal has been received;
the camera starts photometric processing during the preparatory flash emission based upon the flash emission timing information;
the flash emission timing information includes information about a time difference from a reference signal in the second signal until the preparatory flash emission is started, and information about a light emission interval of the preparatory flash emission; and
if the second signal has not been received by the first communication unit even after having waited a predetermined time period after wirelessly transmitting the first signal, then the camera wirelessly re-transmits the first signal.

2. A photography system according to claim 1, wherein:
a wireless re-transmission of the first signal is limited to a predetermined number of times.

3. A photography system according to claim 2, wherein:
when the camera wirelessly transmits from the first communication unit to the second communication unit a third signal that commands, from the camera side to the photography illumination device side, main flash emission during photography, the camera stops wireless transmission of the third signal if the second signal is not received by the first communication unit in spite of the wireless re-transmission of the first signal.

4. A photography system according to claim 3, wherein:
the camera informs of at least one of the fact that no second signal has been received by the first communication unit, and the fact that the main flash emission is not performed.

5. A photography system according to claim 4, wherein:
a plurality of photography illumination devices are included;
the camera wirelessly transmits the first signal from the first communication unit to the second communication unit of each of the plurality of photography illumination devices; and
if there are one or more photography illumination devices from which no second signal has been received after wireless transmission of the first signal, then the camera performs photography using auxiliary photographic light from photography illumination devices other than the one or more photography illumination devices, or performs photography without using auxiliary photographic light from any of the plurality of photography illumination devices.

6. A camera, constituting a photography system according to claim 5.

7. A photography illumination device, constituting a photography system according to claim 5.

8. A photography system, comprising:
a camera that is electrically connected with a first communication unit; and
a photography illumination device that is electrically connected with a second communication unit, wherein:
the camera wirelessly transmits from the first communication unit to the second communication unit a first signal that includes synchronization data and commands, from the camera side to the photography illumination device side, a preparatory flash emission that precedes a main flash emission during photography;
the photography illumination device wirelessly transmits from the second communication unit to the first communication unit a second signal that includes the synchronization data and includes flash emission timing information of the preparatory flash emission, and that carries information, from the photography illumination device side to the camera side, as to the effect that the first signal has been received;
the camera starts photometric processing during the preparatory flash emission based upon the flash emission timing information;
the flash emission timing information includes information about a time difference from a reference signal in the second signal until the preparatory flash emission is started, and information about a light emission interval of the preparatory flash emission; and
if the second signal has not been received by the first communication unit even after having waited a predetermined time period after wirelessly transmitting the first signal, then the camera wirelessly re-transmits the first signal.

9. A photography system according to claim 8, wherein:
a wireless re-transmission of the first signal is limited to a predetermined number of times.

10. A photography system according to claim 9, wherein:
when the camera wirelessly transmits from the first communication unit to the second communication unit a third signal that commands, from the camera side to the photography illumination device side, main flash emission during photography, the camera stops wireless transmission of the third signal if the second signal is not received by the first communication unit in spite of the wireless re-transmission of the first signal.

11. A photography system according to claim 10, wherein:
the camera informs of at least one of the fact that no second signal has been received by the first communication unit, and the fact that the main flash emission is not performed.

12. A photography system according to claim 11, wherein:
a plurality of photography illumination devices are included;
the camera wirelessly transmits the first signal from the first communication unit to the second communication unit of each of the plurality of photography illumination devices; and
if there are one or more photography illumination devices from which no second signal has been received after wireless transmission of the first signal, then the camera performs photography using auxiliary photographic light from photography illumination devices other than the one or more photography illumination devices, or performs photography without using auxiliary photographic light from any of the plurality of photography illumination devices.

13. A camera, constituting a photography system according to claim 12.

14. A photography illumination device, constituting a photography system according to claim 12.

\* \* \* \* \*